United States Patent [19]

Greutert et al.

[11] 4,287,066

[45] Sep. 1, 1981

[54] SIEVE HAVING SUBSTANTIALLY PLANE SIEVE SHEETS AND A METHOD FOR ITS MANUFACTURE

[75] Inventors: Albert Greutert, Sachseln; Ernst Stumvoll, Sarnen, both of Switzerland

[73] Assignee: Elfo AG Sachseln, Sachseln, Switzerland

[21] Appl. No.: 721,632

[22] Filed: Sep. 8, 1976

[30] Foreign Application Priority Data

Sep. 11, 1975 [DE] Fed. Rep. of Germany ....... 2540532

[51] Int. Cl.³ .................... B01D 35/02; B01D 39/20; B29F 1/10
[52] U.S. Cl. ........................... 210/464; 29/163.5 F; 29/460; 29/513; 210/482; 210/498; 210/500.1; 209/397; 209/399
[58] Field of Search ............... 209/274, 281, 352, 353, 209/359, 409, 397–399, 392; 426/77, 82; 210/499, 498, 464, 483, 209, 482, 500.1; 264/257, 259, 273, 274, 261, 267, 268, 156, 275, DIG. 48, DIG. 70, 263; 156/268, 314; 29/163.5 F, 513, 460; 55/494, 518, 519; 428/64, 136; 99/295, 306

[56] References Cited

FOREIGN PATENT DOCUMENTS

| 2153901 | 3/1973 | Fed. Rep. of Germany | 210/498 |
| 1098513 | 11/1955 | France | 210/499 |
| 741918 | 12/1955 | United Kingdom | 210/499 |

Primary Examiner—Ralph J. Hill
Attorney, Agent, or Firm—Townsend and Townsend

[57] ABSTRACT

A sieve sheet having radially extending separating slots in order to subdivide the area of the sieve sheet into sieve segments. The separating slots are embedded with plastics material. The sieve segments may be arranged in a configuration differing slightly from a plane, thus stiffening the sieve.

11 Claims, 5 Drawing Figures

SIEVE HAVING SUBSTANTIALLY PLANE SIEVE SHEETS AND A METHOD FOR ITS MANUFACTURE

BACKGROUND OF THE INVENTION

The invention relates to a sieve having at least one substantially plane sieve sheet and to a method for its manufacture.

Plane sieve sheets, especially those made from a rather undilatable or unresilient material, i.e. from perforated metal foils, have the disadvantage that they are subject to deformation. Such deformations occur especially if the rim of the sieve sheet is embedded with plastics material or if the sieve is connected to a plastics container.

In order to avoid such deformations, prior sieves have a curved configuration of the sieve sheet. Such kinds of sieves, however, are difficult in manufacture, especially when they are made of perforated metal foils.

SUMMARY OF THE INVENTION

It is an object of the invention to provide a substantially plane sieve having a high rigidity and a low tendency to deformation.

Another object of the invention is the provision of a sieve having at least one substantially plane sieve sheet, which is provided with radially extending separating slots in order to subdivide the sieve sheet into sieve segments which may be arranged slightly differing from a plane configuration, and wherein the separating slots are embedded by plastics material acting as struts to stiffen the sieve.

Still another object is the provision of a sieve made of a plurality of distinct sectorial sieve plates or elements, the outer edges of which have connecting means for connecting adjacent ones of the sectorial sieve elements such that adjacent radial edges of the sieve elements are distant from one another, thus forming separating slots.

By dividing the sieve into a plurality of sieve elements and by embedding adjacent edges by plastics material in a strut-like configuration, the rigidity of the sieve is greatly enhanced and the tendency to deform is minimized.

DESCRIPTION OF A PREFERRED EMBODIMENT

It should be noted that the term "plane" used throughout the specification is intended to designate an even or plane configuration of a sieve sheet as well as a slightly pyramidal or conical configuration of the same, which lastmentioned configuration serves only to counteract the tendency of warping of the sieve sheet and may be undiscernable to a user.

Figure 1:
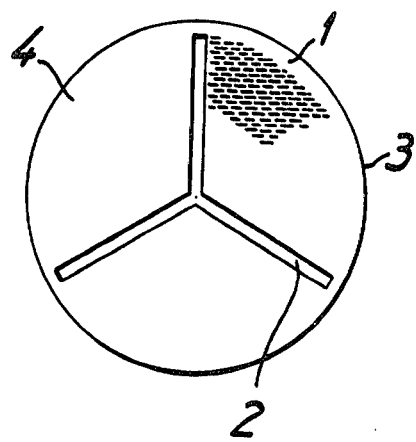
FIG. 1 is a top view of a generally plane sieve sheet.

FIG. 1 shows a generally plane circular sieve sheet 1 which is provided with three radially extending separating slots 2 which extend from the center to the periphery 3 of the sieve sheet and allow to bend the three sectorial segments 4 which are defined by the separating slots, out of a plane.

Figure 2:
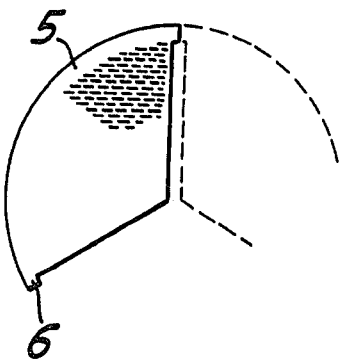
FIG. 2 is a top view of a sieve segment of a practically plane sieve sheet made of three segments.

FIG. 2 shows an alternate embodiment of a practically plane sieve sheet which is composed of three individual sectorial sieve plates or elements 5 which are provided at their edges with connecting tongues 6 which serve to connect adjacent sieve elements 5 with one another. Such a connection may be realized by spot-welding or by providing holes in the connecting tongues adapted to receive rivets connecting these parts.

The embodiment shown in FIG. 2 has the advantage that the sieve elements 5 produce less scrap when being punched from sheet metal and that the coverage of a master plate is increased when manufacturing the sieve elements by electrodeposition.

Figure 3:
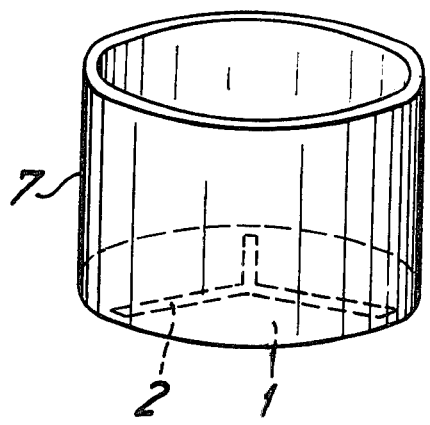
FIG. 3 is a perspective view of a sieve having only one plane sieve sheet to which a plastics container is affixed.

FIG. 3 shows an embodiment wherein a sieve sheet is fixed to a plastics container. The sieve sheet is formed by a practically plane sieve sheet according to FIG. 1 the periphery of which is embedded in the lower rim of a cylindrical plastics container 7 which may be formed together with the plastics embedding of the separating slots 2.

In manufacturing such a strainer, the plane sieve sheet 1 is laid into a mold which is adapted to but against both sides of the surface of the plane sieve sheet 1, and which forms three grooves extending about the axis of the separating slots 2 which grooves are somewhat wider than the separating slots 2. The mold further comprises a hollow cylindrical region provided with at least one discharge opening. Such molds are known in the art and do not form part of the present invention.

The hollow cylindrical region is in communication with the grooves surrounding the separating slots 2. At the central point of the separating slots 2 or in the center of the plane sieve sheet 1, where all three separating slots meet, plastics material is filled into the mold. Since the shape of the mold differs somewhat from a plane configuration in the region of the plane sieve sheet, the sieve elements 4 of the sieve sheet 1 are forced out of the plane. By subdividing the surface of the sieve sheet 1 into several individual regions of segments, by embedding the separating slots in plastics material and by providing a slightly pyramidal shape of the sieve sheet, a great stability or resistance against deformation or warping is achieved. Filling in the plastics material at a central point, where all the separating slots meet, assures a uniform flow of the plastics material and a firm connection of the periphery 3 of the sieve sheet with the lower rim of the cylindrical plastics container 7.

Figure 4:
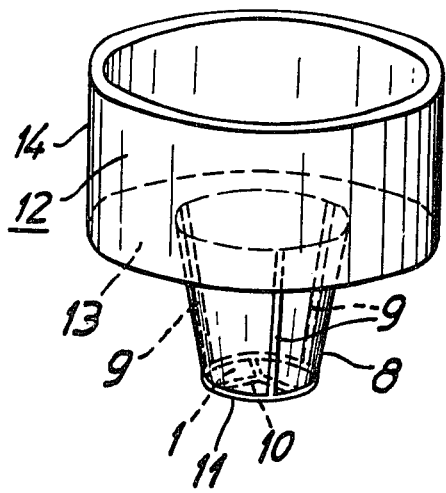
FIG. 4 is a perspective view of a sieve having one plane sieve sheet and a slightly frustro-conically shaped sieve sheet to which a plastics container is affixed.

FIG. 4 shows an alternate embodiment of a sieve having a plastics container affixed thereto, the sieve having a frustro-conical configuration. The bottom of the sieve is formed by a plane sieve sheet according to FIGS. 1 or 2, and the outer wall 8 of the sieve is formed by three almost trapezoidal plane sieve sheets which are connected with one another along their tapered edges by plastics embeddings 9 which are similar to the plastics embeddings 10 of the separating slots of the plane sieve sheet 1. Connection of the outer wall 8 with the bottom of the sieve is realized by an annularly shaped plastics embedding 11 which communicates both with the plastics embeddings 9 of the outer wall 8 and with the plastics embeddings 10 of the separating slots 2.

A plastics container 12 is fixed to the upper or open end rim of the sieve which container is formed by a slightly conically inclined bottom 13 and a cylindrical side wall 14.

In manufacturing such a sieve with adjacent plastics container, a correspondingly shaped mold is used and the plastics material is filled in at a central region of the separating slots 2. The plastics material flows radially outwardly and forms the plastics embeddings 10. Thereupon the plastics material spreads along the circumference of the sieve sheet 1 and fills the space of the mold forming the annularly shaped plastics embedding 11. From there, the plastics material flows along the spaces of the mold which form the plastics embeddings 9 and then into the remaining part of the mold corresponding to the plastics container 12.

The sieve, when firmly combined with the plastics container according to FIG. 4 is easy in manufacture, has a great stability and does not tend to deform due to the different thermal expansion of the plastics material on the one hand and the sieve sheet segments on the other hand, e.g. when used as a coffee filter.

Figure 5:
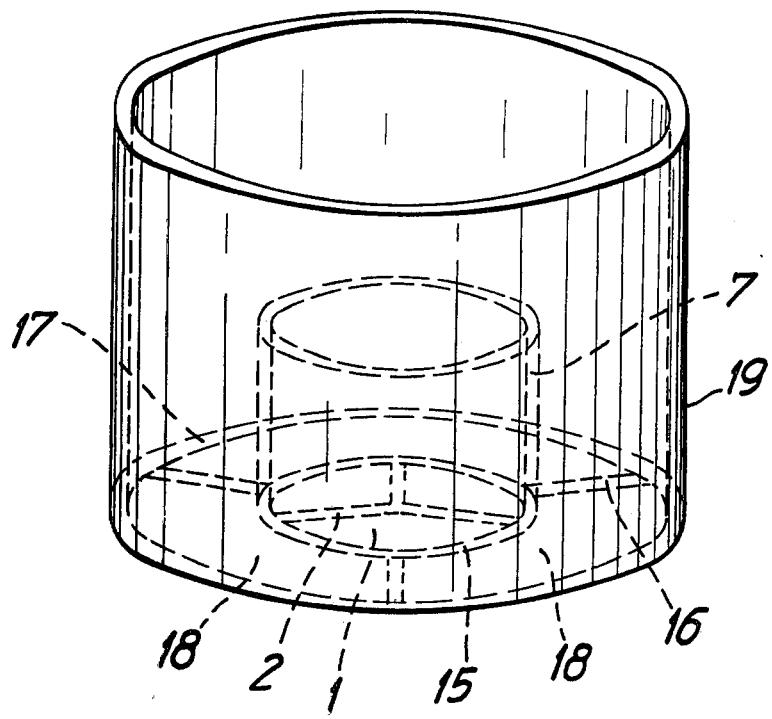
FIG. 5 is a perspective view of a dual-chamber filter constructed according to the invention.

FIG. 5 shows a dual-chamber filter having a central filtering region corresponding to FIG. 3, and an outer filtering region lying concentrically around the central filtering region and formed by three arcuate filter segments 18, the radially inner edges of which are fixed to the bottom of the inner plastics container 7 as are the circumferential edges of the sieve sheet 1. The outer circumferential edges of arcuate filter segments 18 are embedded in the lower rim of outer container 19.

Radially extending struts 16 are provided which interconnect the circumferential edges or rims of the inner and outer container.

The plastics embeddings of the separating slots and of the connections of the rims of the sieve sheet with plastics may be made in accordance with German patent application 2 153 901.

Although it is within the scope of the invention that the individual sieve segments are bent into a curved configuration, it is preferable that each of the sieve segments has a plane surface. However, when the plane sieve segments are held together by the struts of plastics material, they form a surface slightly differing from a plane, for instance a trihedral configuration in case of three individual segments. The deviation from a plane may be as low as to be unvisible or indiscernable.

We claim:

1. A sieve having at least one substantially planar sieve surface comprising: a sieve sheet defining the planar sieve surface and including slots extending through the sheet and dividing the sheet into a plurality of sieve sheet sections, the slots being arranged so that the sections can be deflected out of their common plane; and a plastic material filling the slots, securing to each other portions of the sections adjoining the slots and maintaining the sections deflected out of their common plane by a relatively minor amount.

2. A sieve according to claim 1 wherein the sieve sheet comprises a plurality of separate sheet portions defining the sections, each portion having an edge adjacent a corresponding edge of an adjoining portion, the edges being arranged so that they are spaced apart wherein the portions are secured to each other to thereby define the slots.

3. A sieve according to claim 2 wherein the sieve sheet defines a periphery, and including means on each portion and located adjacent the periphery for connecting the portions to each other to thereby define the sheet.

4. A sieve comprising a substantially planar sieve sheet defined by a plurality of adjoining sheet sections, the sections being normally disposed in a common plane and defining a plurality of slots between opposing edges of adjacent sections, the slots converging at a common point and extending from the point towards the periphery; and a homogenous plastic material disposed in and filling the slots and further surrounding a periphery of the sheet, the plastic material in the slots and the plastic material surrounding the periphery being anchored to the sheet and deflecting the sheet sections by a minor amount from said common plane.

5. A sieve according to claim 4 wherein the sections are separate of each other, and including connecting means for securing the sections to each other.

6. A sieve according to claim 4 including at least three sections, and wherein the slots and the plastic material filling the slots are slightly inclined relative to the plane of the sheet.

7. A sieve according to claim 4 wherein the portion of the plastic material surrounding the periphery of the sieve sheet extends transversely away from the sheet to define an open-ended, tubular container having an end closed by the sheet.

8. A sieve comprising a substantially planar sieve sheet defined by a plurality of adjoining sheet sections, each pair of adjoining sections defining a slot between opposing edges of such adjoining sections, the slots of the sieve converging towards a common center point and extending from such point towards a periphery of the sieve defined by the sections; a plastic material disposed in each slot, anchored to the edges of the adjoining sections and deflecting the edges of the sections by relatively minor amounts out of their common plane so that the sieve sheet is substantially rigidified and effectively resists deformation and warping of the sieve sheet out of its substantially planar configuration.

9. A sieve sheet according to claim 8 including connecting means independent of the plastic material and securing portions of the edges of adjoining sections to each other.

10. A sieve according to claim 9 wherein the connecting means is disposed adjacent the periphery of the sieve.

11. A substantially planar sieve including an integrally constructed, tubular container attached thereto comprising: a substantially planar sieve sheet defined by a plurality of adjoining sheet sections, the sections defining a plurality of slots between opposing edges of adjacent sections, the slots converging towards a common point and extending from the point outwardly thereof towards a periphery of the sieve sheet; a plastic material disposed in and filling the slots, anchored to opposing edges of adjacent sections, and maintaining the opposing edges inclined relative to the plane of the sheet by a relatively minor amount so as to define with the sheet sections a plurality of relatively inclined surfaces, the inclination of which is substantially undiscernible to a user of the sieve, whereby the inclination of the sieve sheet section surfaces resists deformation and increases the rigidity of the sieve; and additional plastic material defining said tubular container extending substantially peripendicularly away from the sieve sheet, anchored to the sieve sheet along the periphery thereof, and connected with the plastic material in the slots.

* * * * *